(12) United States Patent
Slack

(10) Patent No.: US 8,616,419 B2
(45) Date of Patent: Dec. 31, 2013

(54) REUSABLE CONTAINERS

(76) Inventor: Martin Slack, Cuddington (GB)

( * ) Notice: Subject to any disclaimer, the term of this patent is extended or adjusted under 35 U.S.C. 154(b) by 38 days.

(21) Appl. No.: 13/187,468

(22) Filed: Jul. 20, 2011

(65) Prior Publication Data

US 2012/0018460 A1 Jan. 26, 2012

Related U.S. Application Data

(60) Provisional application No. 61/366,317, filed on Jul. 21, 2010.

(51) Int. Cl.
*B67D 3/00* (2006.01)
*B67D 7/06* (2010.01)

(52) U.S. Cl.
USPC ............................ 222/534; 533/536; 533/537

(58) Field of Classification Search
USPC ......... 222/466, 475, 518, 526–530, 533, 536, 222/537, 568
See application file for complete search history.

(56) References Cited

U.S. PATENT DOCUMENTS

| | | | | |
|---|---|---|---|---|
| 193,016 | A | * | 7/1877 | McClave ....................... 222/184 |
| 1,537,399 | A | * | 5/1925 | Wiswell ........................ 222/536 |
| 1,617,992 | A | | 2/1927 | Drake |
| 2,987,228 | A | * | 6/1961 | Matson .......................... 222/513 |
| 3,146,913 | A | * | 9/1964 | Kiyoshi ......................... 222/110 |
| 5,277,343 | A | * | 1/1994 | Parsonage ..................... 222/484 |
| 5,671,868 | A | | 9/1997 | Herr |
| 5,704,408 | A | | 1/1998 | Law |
| 5,924,608 | A | * | 7/1999 | Chiu ............................. 222/538 |
| 6,581,851 | B1 | | 6/2003 | Murphy |
| 7,066,358 | B2 | * | 6/2006 | Monsalve et al. ............. 222/158 |
| 7,500,622 | B2 | * | 3/2009 | Golding et al. ............... 239/657 |
| 7,513,394 | B2 | * | 4/2009 | Bone .......................... 222/481.5 |
| 2007/0000954 | A1 | | 1/2007 | Hill |
| 2010/0072230 | A1 | * | 3/2010 | Hatch .......................... 222/534 |

FOREIGN PATENT DOCUMENTS

| | | |
|---|---|---|
| GB | 905900 | 9/1962 |
| GB | 2329379 | 3/1999 |
| WO | WO2007/025378 | 3/2007 |
| WO | WO2007/098626 | 9/2007 |

* cited by examiner

*Primary Examiner* — Paul R Durand
*Assistant Examiner* — Vishal Pancholi
(74) *Attorney, Agent, or Firm* — McDonnell Boehnen Hulbert & Berghoff

(57) ABSTRACT

A reusable container having a body with an inlet, and an outlet provided with an elongate dispensing spout mounted for pivotal movement between a first position, where the spout overlies a portion of the body, and a second position, where the spout extends away from the body. A valve adjacent the first end of the spout prevents passage of liquid from the body into the spout when the spout is in the first position and allows passage of liquid from the body into the spout when the spout is in the second position. The valve changes between first and second conditions in response to pivotal movement of the spout. The spout includes a first locating portion which engages a second locating portion on the body to retain the spout in the first position. A second valve adjacent the spout is biased to a closed state by a resilient element.

21 Claims, 9 Drawing Sheets

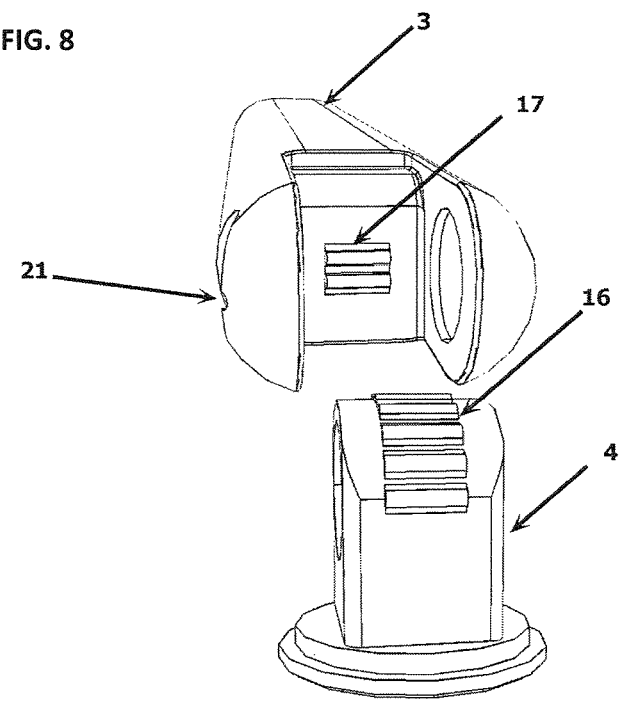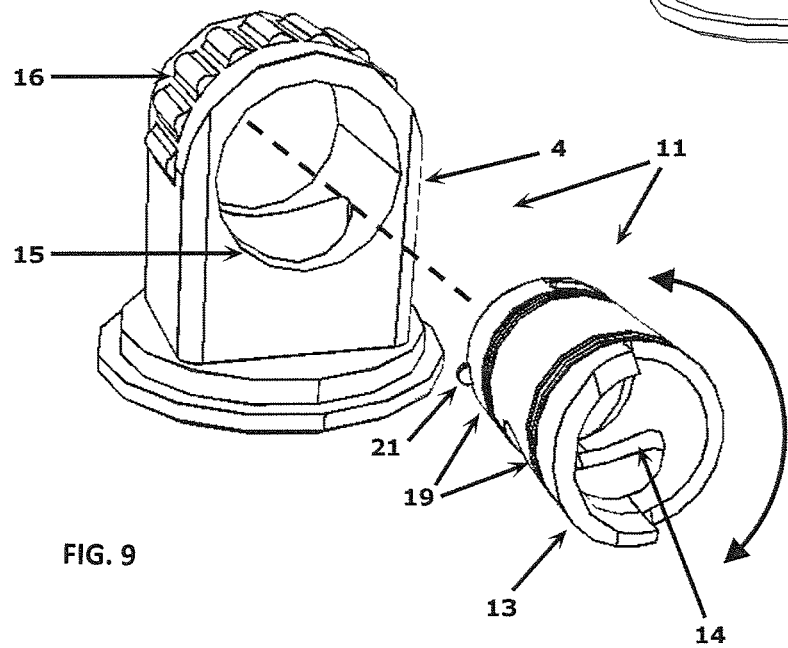

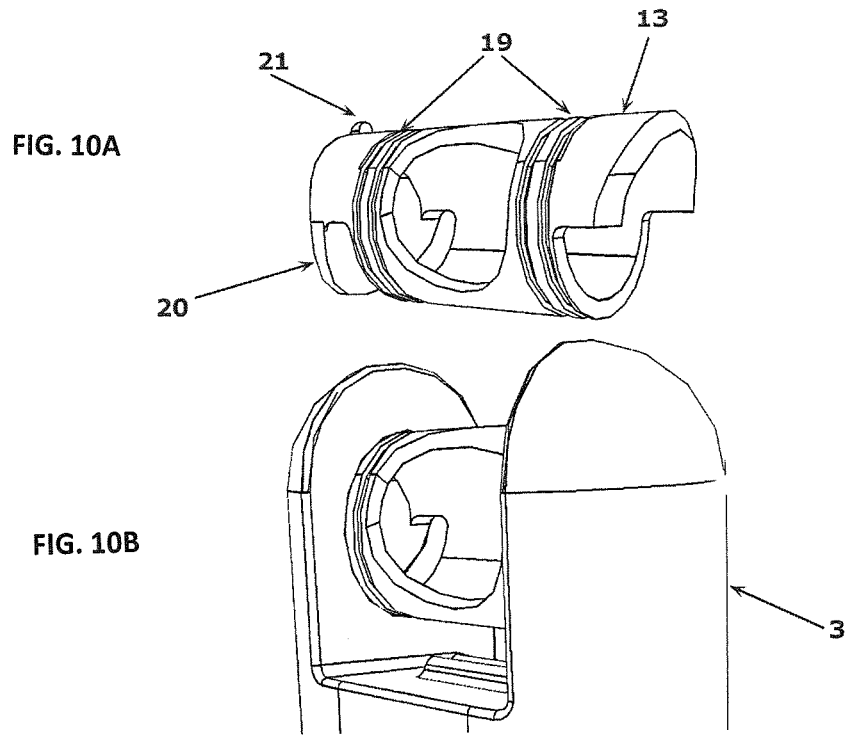
FIG. 10A
FIG. 10B
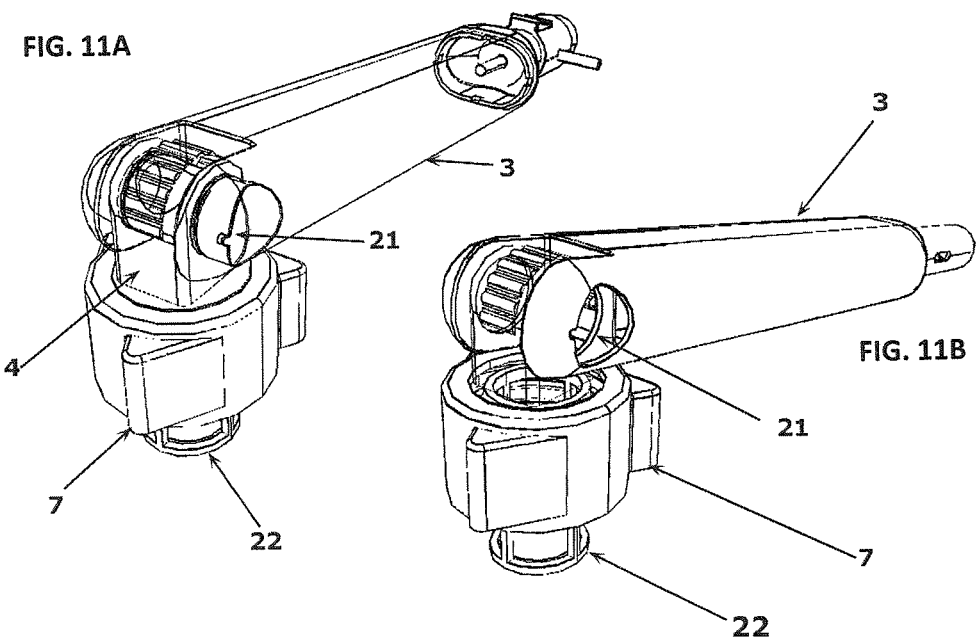
FIG. 11A
FIG. 11B

REUSABLE CONTAINERS

This invention relates to reusable containers for safely storing, dispensing and carrying liquids, and particularly but not exclusively to such containers intended to contain fuel such as petrol or diesel.

In the past a variety of fuel container designs have been proposed. Typically these may be of plastics or of metal, having an opening provided with a threaded cap which can be removed so that fuel can be put into and dispensed from the can. A separate spout is provided, releasably attached to the container. When it is desired to dispense fuel from the container, for example into the fuel tank of a vehicle or garden machinery such as a lawn mower, the cap is removed and the spout is attached to the opening. This arrangement has the disadvantage that fuel can be spilt whilst attaching or detaching the spout, the spout might not be attached properly, and the arrangement is cumbersome. Such an arrangement is disclosed in, for example, GB 905900 and in that arrangement is spout is attached to the top of the container so that it can be used as a handle.

GB 2329379 discloses a container particularly intended for use with granular material such as lawn fertilizer. A spout is attached to an opening into the container and can be rotated from an inoperative condition in which the spout extends over the body of the container, to an operative condition projecting from the container. A valve is provided where the spout is joined to the opening. This valve is closed when the spout is in the inoperative condition and is opened when the spout is rotated to the operative condition. The spout assembly is covered by a removable cap. There is a separate handle formed in the body of the container. The lawn fertilizer is sold to customers in the container and there is no refill opening or other disclosure of re-filling the container.

U.S. Pat. No. 1,617,992 discloses a container of oil which can be carried in an automobile. There is a separate filling opening with a cap which is sealed in place once the container has been filled. There is a spout which is attached permanently to an opening into the container, and which can be rotated from an inoperative condition, in which the spout extends over the body of the container, to an operative condition projecting from the container. A valve is provided where the spout is joined to the opening. This valve is closed when the spout is in the inoperative condition and is opened when the spout is rotated to the operative condition. A frangible strip is attached to the spout when the container is first supplied, and this is broken when a customer uses the container. The oil is supplied to customers in the container, with the filling opening sealed, and there is no disclosure of re-filling the container. When the spout is in the inoperative condition it can be used as a handle.

WO 2007/098626 describes a refillable fuel container having a separate filling opening and dispensing spout, and a separate handle. The spout is attached to an opening into the container and can be rotated from an inoperative condition in which the spout extends over the top of the container, to an operative condition projecting from the container. A valve is provided where the spout is joined to the opening. This valve is opened by means of a remote operating mechanism on the other side of the container from the spout. A locking arrangement prevents the valve opening when the spout is in the inoperative condition but permits opening when the spout is rotated to the operative condition.

US 2007/0000954 discloses a container particularly intended for use with granular material such as lawn fertilizer. A spout is attached to an opening into the container and can be rotated from an inoperative condition in which the spout extends over the body of the container, to an operative condition projecting from the container. In the inoperative condition, the end of the spout remote from the opening is held by a locking structure. A valve is provided where the spout is joined to the opening. This valve is closed when the spout is in the inoperative condition and is opened when the spout is rotated to the operative condition. In the inoperative condition the spout can be used as a handle. The lawn fertilizer or other product is sold to customers in the container and there is no refill opening or other disclosure of re-filling the container.

WO 2007/025378 discloses a refillable fuel container having a separate filling opening and dispensing spout, and a separate handle. The spout is attached to an opening into the container and can be rotated upwardly from an inoperative condition in which the spout extends downwardly against one end of the container, to an operative condition projecting from the container. A control valve is provided to control the flow of liquid from the container to the spout, this being operated by rotation of the handle. A ball valve is provided where the spout is joined to the opening, to prevent accidental spillage whilst handling the container. The ball valve is closed when the spout is in the inoperative condition and is opened when the spout is rotated to the operative condition so that liquid can flow from the container into the spout when the control valve is operated.

U.S. Pat. No. 5,671,868 discloses a refillable fuel container having a separate filling opening and dispensing spout, and a separate handle. The spout is permanently attached to an opening into the container and can be rotated upwardly from an inoperative condition in which the spout extends downwardly against one end of the container, to an operative condition projecting from the container. A valve is provided where the spout is joined to the opening. This valve is closed when the spout is in the inoperative condition and is opened automatically when the spout is rotated to the operative condition so that liquid can flow from the container into the spout. U.S. Pat. No. 5,671,868 therefore discloses a reusable container for storing and dispensing a liquid, comprising a container body provided with an inlet for introducing the liquid into the container body, and an outlet for dispensing the liquid from the container body, there being a closure for the inlet which is removable to permit introduction of the liquid into the container body to refill the container; in which the outlet is provided with an elongate dispensing spout which has a first end adjacent the outlet and a second end from which liquid can be discharged; the spout is mounted for pivotal movement between a first position in which the spout overlies a portion of the container body and a second position in which the spout extends away from the container body; and a valve is provided adjacent the first end of the spout, the valve having a first condition which prevents passage of the liquid from the container body into the spout when the spout is in the first position, and having a second condition which allows the passage of the liquid from the container body into the spout when the spout is in the second position, the valve changing between the first and second conditions automatically in response to pivotal movement of the spout from the first position to the second position.

Viewed from one aspect, the present invention is characterised over U.S. Pat. No. 5,671,868 in that the spout is provided with a first locating portion which engages releasably with a second locating portion on the container body so as to retain the spout in the first position, and a second valve is provided adjacent the second end of the spout, the second valve including a resilient element biasing the second valve to a closed state and a control member for changing the second valve to the closed state.

Preferably, the control member is movable axially with respect to the spout to change the second valve to the open state. In such an arrangement, preferably the first locating portion is connected to the control member and the arrangement is such that when the first locating portion is engaged with the second locating portion, the second valve is in the closed state. In a preferred embodiment of such an arrangement, when the first locating portion is engaged with the second locating portion, the resilient element serves to bias the first locating portion into engagement with the second locating portion.

Thus, in accordance with the invention there is provided additional security, which is of particular importance in the case of a container intended for containing fuel such as petrol, diesel, bio-ethanol and other highly flammable liquids. In order for fuel to pass out of the spout, the spout must be moved to the operative condition so that the first valve is opened to allow fuel to pass into the spout, and that will require disengaging the locating portions. In addition, the control member must be moved to change the second valve from its closed state to its open state, so that the liquid can flow out of the spout. When the spout is pivoted back to the inoperative condition, it is held in place by interengagement of the first and second locating portions. The second valve is then in the closed state, and preferably the resilient element of the second valve acts through the control member to bias the locating portions into engagement.

Preferably, the locating portion projects laterally from the control member and is such that the second valve can be opened by engagement of the locating portion with material surrounding an opening, such as the fuel filler inlet of a vehicle.

As such, a fuel filling spout with a valve adjacent its end, which can be opened by axial movement of a control member, is known. Such an arrangement is shown in U.S. Pat. No. 5,704,408 and U.S. Pat. No. 6,581,851. In both of these arrangements the spout is releasably secured to an opening of the container of fuel, and the valve at the end of the spout is the only valve preventing passage of fuel from the container.

In a preferred embodiment of the present invention, when the spout is in the inoperative condition and held in place by the locating portions, the spout can provide at least part of a handle for lifting the container when being transported.

The inlet and the outlet could be provided by separate openings, with the spout attached to the outlet opening and a removable closure being provided for the inlet opening. Alternatively, the inlet and the outlet could be provided by the same physical opening, with the spout being releasably attached to the opening so that it can be removed, permitting the opening to serve as the inlet for filling the container.

According to another aspect of the present invention, there is provided a reusable container for storing and dispensing a liquid, comprising a container body provided with an inlet for introducing liquid into the container body, and an outlet for dispensing liquid from the container body, there being a closure for the inlet which is removable to permit introduction of liquid into the container body; wherein the outlet is provided with an elongate dispensing spout which has a first end adjacent to the outlet and a second end from which liquid can be discharged; the spout is mounted for pivotal movement between a first position in which the spout overlies a portion of the container body and a second position in which the spout extends away from the container body; a first valve is provided adjacent to the first end of the spout, the valve having a first condition which prevents the passage of liquid from the container body into the spout when the spout is in the first position, and having a second condition which allows the passage of liquid from the container body into the spout when the spout is in the second position, the first valve changing between the first and second conditions in accordance with the pivotal movement of the spout between the first and second positions; and the spout is provided with a first locating portion which engages with a second locating portion on the container body so as to retain the spout in the first position, overlying the container body, the arrangement being such that the first locating portion can be repeatedly disengaged from and re-engaged with the second locating portion. This permits quick and safe positioning of the spout such that accidental spillage is prevented, whilst ensuring that the spout cannot accidentally be dislodged from said first position. It advantageously assures that the spout is either in an arrangement permitting dispensing, or in an arrangement permitting storage and/or carrying. Preferably, the design ensures that only one of dispensing and convenient carrying is possible, so that a user will be more readily alerted to an incorrect spout position. In preferred arrangements, the first locating portion provided on the spout at a position which is displaced along the spout from the first end of the spout to the second end of the spout. The first locating portion could, for example, be provided adjacent to the second end of the spout, or be provided at an intermediate region along the spout.

Preferably, when in the first position, the portion of the spout between the first and second ends of the spout serves as at least part of a handle for carrying the container. More preferably it serves as at least the major portion thereof. Optionally, when the spout is retained in the first position, a longitudinally extending part of the body of the spout is received within a channel which is part of a handle for carrying the container. This may take the form of struts extending either side of the spout. The channel may be oriented to prevent movement of the first end of the spout away from the container body unless a user removes the strut from the channel.

Optionally, when the spout is retained in the first position, it is at least partially seated within a channel forming the underside of a handle.

Optionally, a second valve is provided towards the second end of the spout, the second valve being movable between a closed state and an open state in which liquid can be discharged from the spout. Advantageously, the second valve is provided with engagement means to engage with a receptacle, such as a fuel inlet of a vehicle, so that a user can control the flow of liquid from the container by adjusting its position relative to the receptacle. It further permits the user to upend the container to dispense liquid into the receptacle, and to be assured that as soon as the container is lifted therefrom, the flow will cease. This helps prevent accidental spillage.

Preferably, the arrangement is such that when the first and second locating portions are engaged, the second valve is in the closed state. This provides additional safety to mitigate the possibility of leakage during carrying or storage.

Optionally, the second valve is biased to the closed state and comprises an operating sleeve which is movable axially with respect to the spout and is provided with laterally projecting extensions. This assists with the described engagement with a receptacle, and the automatic shut off as the spout is lifted from the receptacle.

Further optionally, the laterally projecting extensions constitute the first locating portion. This facilitates a latch closure, whereby, when the spout is folded to a storage or carrying arrangement, the second end thereof fixedly attaches to the container body until released by a user. The valve may prevent the spout's second end being dislodged away from the container body while its laterally projecting extensions are engaged with channels in the container body. However, when the sleeve is slid so as to the open the valve, the laterally projecting extensions are thereby withdrawn from the channels in the container body thereby permitting the spout's second end to be lifted from the container body.

Preferably the container body has a top portion, the outlet being provided adjacent to one end of the top portion, and the spout extending to adjacent to an opposite end of the top portion when the spout is in the first position. This facilitates the spout functioning as a handle for storage or carrying, without need to re-orient the container for the different functions. Where the top of the container is generally rectangular, the spout may extend along the middle thereof, or alternatively substantially diagonally across it.

Optionally, said opposite end of the top portion of the container body is provided with a first hand grip. This facilitates orienting the container during dispensing. Where the container's top is generally rectangular, the hand grip may extend along a short edge thereof. A second hand grip may be provided on the container body below said one end of the top portion. This may further assist orienting the container during dispensing.

Preferably, movement of the spout between the first and second positions is in a plane generally perpendicular to the top portion of the container body. Preferably said first valve permits and restricts movement of the spout in said plane. Optionally, a pivot may be provided to permit the valve to pivot with respect to the container body so as to provide the spout with an extra degree of freedom. Alternatively, no such pivot is provided such that with the valve and spout screwed onto the container body the spout is restricted to movement in a fixed plane generally perpendicular to the top portion of the container body. Optionally the second locating portion on the container body restricts movement of the spout's second end in directions not perpendicular to the top portion of the container body, when the spout is in the first position.

Preferably, the arrangement is such that when the spout is moving from the second position to the first position, the first valve remains in the second condition for a sufficient portion of the extent of movement to permit liquid in the spout to drain back into the container body before the valve changes to the first condition. Optionally, a single opening serves as the inlet and the outlet, and the first end of the spout is connected to the closure. Alternatively the spout is provided for use as an outlet whilst the inlet is provided separately with its own closure.

Further optionally there is a plurality of defined second positions of the spout. This may be provided by means of corrugated or notched sliding interface features between the first end of the spout and a portion of the first valve. Irrespective of whether there is a plurality of defined second positions, the first valve is preferably provided with sufficient frictional reliance to prevent the spout moving under its own weight.

Optionally the container body is provided with two elongate raised portions forming ridges parallel to and either side of the spout when in the first position overlying the container body. This serves to protect the spout from being accidentally dislodged or unlatched. Optionally said first handle portion and the two ridges form a U shaped barrier around the second end of the spout.

According to a further aspect of the present invention there is provided a reusable container for storing and dispensing a liquid, comprising a container body, an opening for introducing liquid into the container body and dispensing liquid from the container body, and a closure for the opening, the closure being removable to permit introduction of liquid into the container body, the closure being provided with an elongate dispensing spout which has a first end connected to the closure and a second end from which liquid can be discharged; wherein the spout is mounted for pivotal movement between a first position in which the spout overlies a portion of the container body and a second position in which the spout extends away from the container body; a first valve is provided adjacent to the first end of the spout, the valve having a first condition which prevents the passage of liquid from the container body into the spout when the spout is in the first position, and having a second condition which allows the passage of liquid from the container body into the spout when the spout is in the second position, the first valve changing between the first and second conditions in accordance with pivotal movement of the spout between the first and second positions.

According to a further aspect of the present invention there is provided a reusable container for storing and dispensing a liquid, comprising a container body provided with an inlet for introducing liquid into the container body, and an outlet for dispensing liquid from the container body, there being a closure for the inlet which is removable to permit introduction of liquid into the container body; wherein the outlet is provided with an elongate dispensing spout which has a first end adjacent to the outlet and a second end from which liquid can be discharged; the spout is mounted for pivotal movement between a first position in which the spout overlies a portion of the container body and a second position in which the spout extends away from the container body; the spout is provided with a first locating portion adjacent to the second end of the spout which engages with a second locating portion on the container body so as to retain the spout in the second position, the portion of the spout between the first and second ends serving as at least part of a handle for carrying the container; and a valve is provided towards the second end of the spout, the valve being movable between a closed state and an open state in which liquid can be discharged from the spout, and the arrangement being such that when the first and second locating portions are engaged the second valve is in the closed state.

Optionally a further valve is provided adjacent to the first end of the spout, the further valve having a first condition which prevents the passage of liquid from the container body into the spout when the spout is in the first position, and having a second condition which allows the passage of liquid from the container body into the spout when the spout is in the second position, the further valve changing between the first and second conditions in accordance with pivotal movement of the spout between the first and second positions.

For a better understanding of the invention and to show how the same may be carried into effect, reference will now be made, by way of example only, to the accompanying drawings, in which:

FIG. 8 is an illustration of the connection between the spout's first end and a pivot;

FIG. 9 is an illustration of the connection between the pivot-tube and the pivot;

FIG. 10a is an illustration of the pivot-tube;

FIG. 10b is an illustration of the pivot tube in place within the spout;

FIG. 11a shows the pivot and pivot tube relative to the position of the spout, and the second end's valve and spout retaining features relative to the spout;

FIG. 11b shows the spout, cap and the conduit route for fluid to pass from the outlet into the spout;

An embodiment of this invention will now be explained with reference to the drawings.

Figure 1:
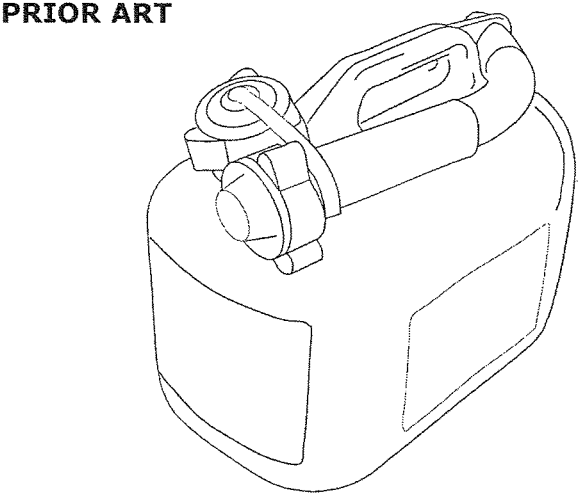
FIG. 1 is an illustration of a prior art fuel can.
Figure 2:
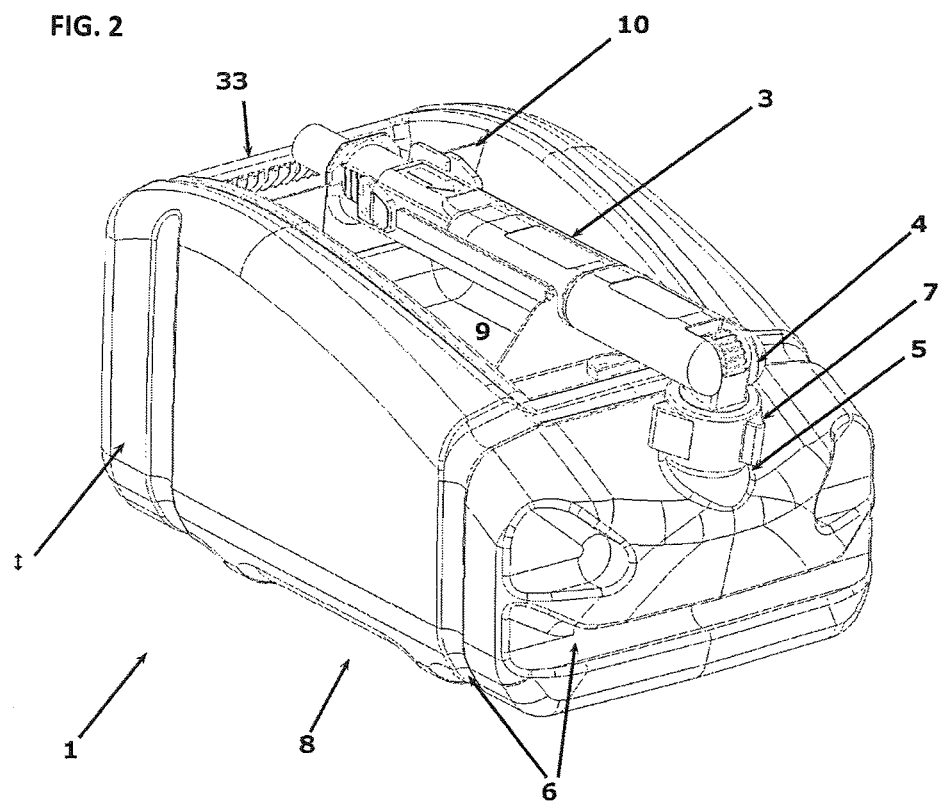
FIG. 2 is a elevated perspective view of a fuel can according to one embodiment of the present invention, further details of which are illustrated in FIGS. 3 to 15 (albeit with an alternative spout end design in FIGS. 11a, 11b, 15a, 15b and 15c) where.

FIG. 2 shows a fuel can (1) according to one embodiment of the present invention. The fuel can (1) has a body (2) and a spout (3) connected by a pivot (4) mounted at an outlet (5) of the fuel can body (2). The body and spout are formed of an injection moulded plastic, and parts of the body are provided with corrugations (6) as required to resist forces likely to be experienced in use. The body has an approximately cuboid form, with an identifiable base, and an upper surface (9) being opposite thereto.

The fuel can outlet (5) is provided with a screw cap (7) which is removable, by rotation, to permit filling of the fuel can body (2) with fuel. The pivot (4) is mounted rotatably on the screw cap (7) such that the screw cap (7) may be rotated for removal without the need for rotating the pivot (4) and spout (3). However, tightening of the screw cap (7) traps a lower portion of the pivot (4) such that when the screw cap (7) is fixedly closed the pivot (4) and spout (3) are prevented from rotating about the axis of the screw cap (7). However the axis of the pivot (4) is perpendicular to that of the screw cap (7) such that when the screw cap is fixedly closed the pivot (4) and spout (3) may rotate about the pivot's axis. Whilst the screw cap (7) is at an outlet end of the generally rectangular upper surface of the fuel can body (2), it is oriented upwards such that it has a nearly vertical axis. By contrast the pivot (4) and spout (3) are arranged to rotate about a horizontal axis.

Where not stated to the contrary, terms such as upper, upwards, vertical and horizontal refer to the orientation of the fuel can (1) when in a carrying orientation, which in this embodiment is the same as a stowing orientation. By contrast a dispensing arrangement is upended with respect to the carrying orientation.

The fuel can (1) in a carrying and stowing arrangement has the spout (3) arranged across the upper surface (9) thereof, passing across the middle of the upper surface (9). A proximal end of the spout (3) is connected with the pivot (4), and releasable engaging means (10) are provided to connect the distal end of the spout (3) with the non-outlet end of the fuel can body (2) upper surface (9).

Figure 3:
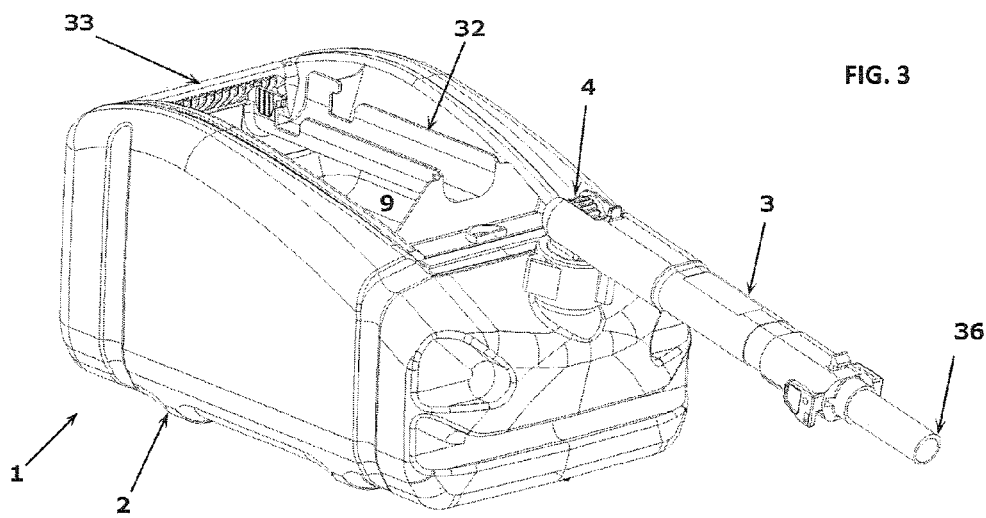
FIG. 3 is a view of the same fuel can, with the spout pivoted to a dispensing position.

Referring to FIG. 3 the spout may be pivoted about the pivot (4) by a user so as to extend away from the fuel can body (2) for dispensing into a vehicle. In the carrying position, the pivot end of the spout (3) is generally above the upper surface (9) of the fuel can body (2).

Figure 4:
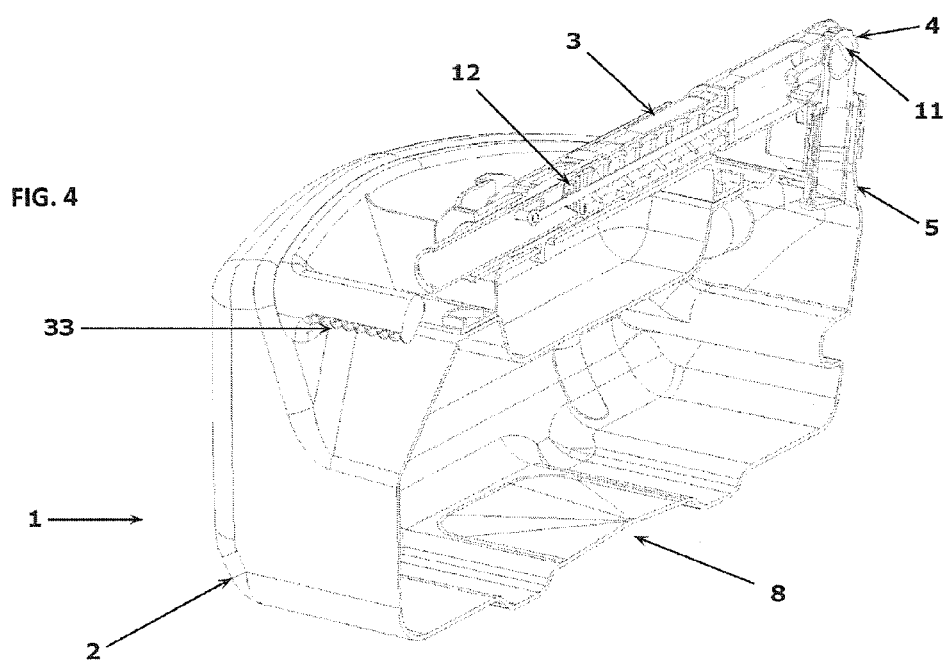
FIG. 4 is a cut-away elevated perspective view showing one half of the fuel can.
Figure 5:
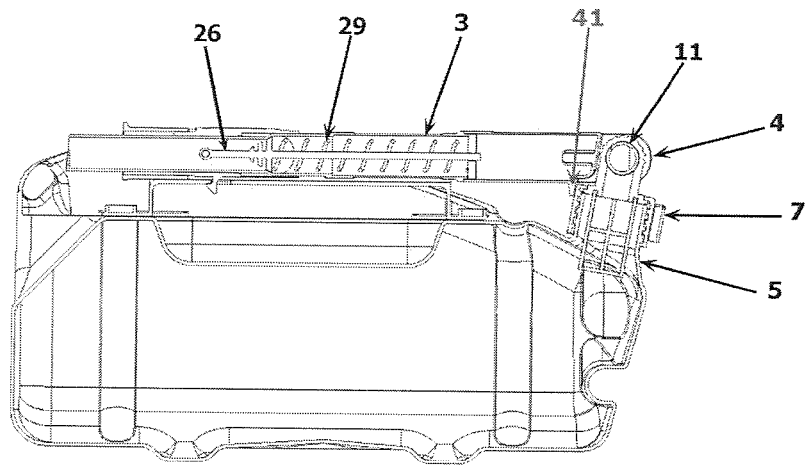
FIG. 5 illustrates a cross-section along the plane of symmetry of the fuel can.

Referring to FIGS. 4 and 5 it can be seen that there are two valves. A first valve (11) is provided by the interface between the pivot and the spout whereby relative rotation therebetween acts to position respective apertures either in register (when the spout is pivoted to a dispensing position), or out of register (when the spout is positioned across the fuel can upper surface (9) for carrying or stowing). The second valve (12) is a linear valve provided within the spout, provided by a plug against an aperture.

Turning to the first valve (11) with reference to FIGS. 8 and 9, a spout (3) is operable to rotate with respect to a pivot (4), and the two are joined by a connecting tube (13). A fluid path is provided upward through the pivot (4), into the connecting tube (13), laterally to the ends of the connecting tube (13), and into the pivot end of the spout (3). The connecting tube (13) is adapted to rotate within the pivot (4), in concert with the spout (3). Thus as the spout is rotated, a valve hole (14) in the connecting tube (13) rotates to or away from a central passageway (15) up through the pivot (4), and thus permits or prevents fluid flow according to the position of the spout (3).

Figure 6:
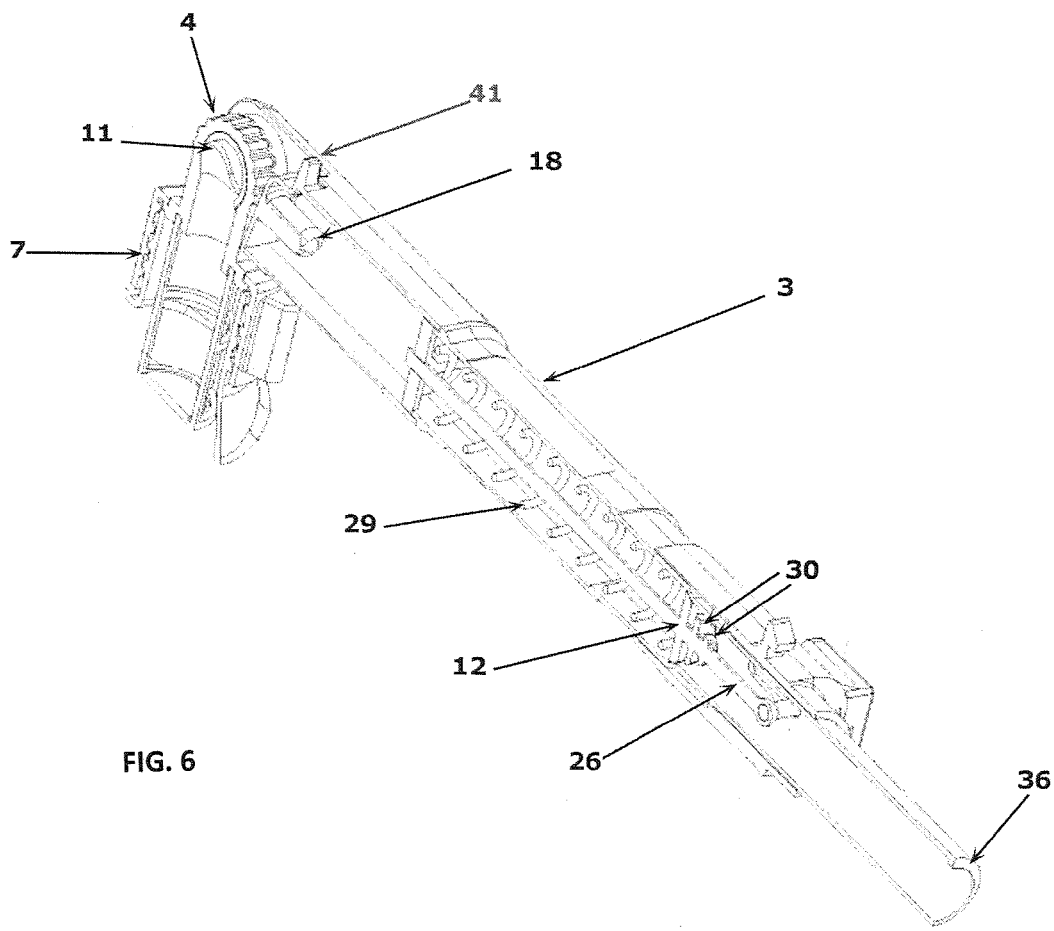
FIG. 6 is a cut-away perspective view of the spout and cap, showing one half thereof.

As can be seen from FIGS. 8 and 9, the pivot is provided with rounded teeth (16) in the fashion of a gear, against which a projection (17) from the spout (3) is resiliently biased, and arranged to prevent unintentional pivoting of the spout. A spring (not shown) is a preferred method for resilient biasing. Also, whilst a set of evenly spaced stable positions are provided here by a set of evenly spaced teeth (16), an unevenly spaced set of stable positions may alternatively be provided instead. A cross section of the spout shown in FIG. 6 shows how the projection is mounted within a recess (18) of the spout (3), providing space for a spring to bias the projection (17) against the teeth (16). In this case the projection has the form of two linear teeth arranged to mesh with the pivot's teeth. Alternatively just one, or indeed an array, may be provided.

As an alternative to a single projection provided with multiple teeth there may be more than one independent projection, which may be arranged at the same or at differing angles around the pivot. This reduces the tendency of the resilient biasing to become less effective after repeated use, as wear on the surface of the projection has a reduced tendency to flatten the teeth, and instead the individual projections extend further out as they wear down. Each individual projection may be spring biased, and may be housed in an indentation in the spout, and may be parallel with the spout.

To prevent leakage of fuel, the connecting tube (13) is provided with two circumferential seals (19) which include two positive seals to the spout (3) (which may be achieved by bonding the components together) immediately outboard of two sliding-contact seals to the pivot (4) (such as using O-rings).

Referring to FIGS. 11a and 11b it can be seen that the connecting tube may be used to assemble the spout (3) to the pivot (4), by inserting the connecting tube last-most laterally through both the spout (3) and pivot (4), and for this reason the connecting tube is provided with a cover portion (20) which serves to cover the entry point of the connecting tube in the side of the spout (3). The connecting tube and spout are further provided with anti rotation keying features (21) to lock the connecting tube against rotation with respect to the spout 3.

Figure 12A:
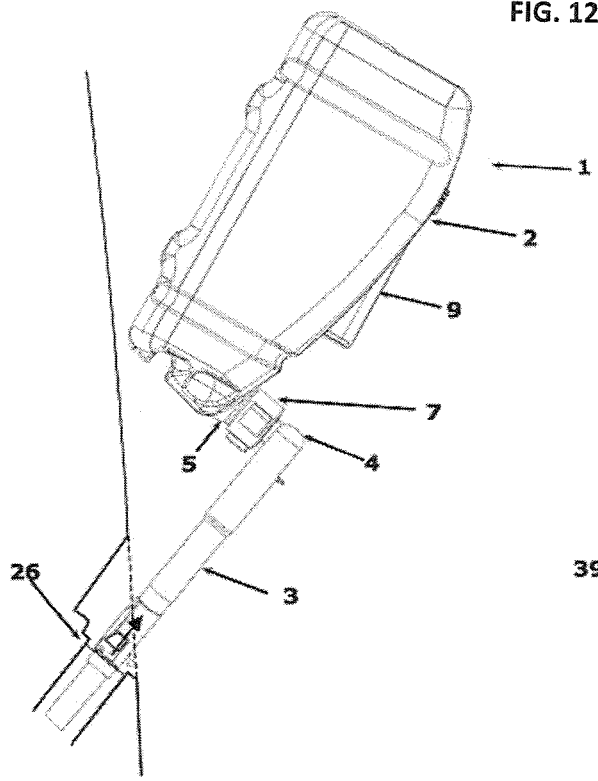
FIG. 12a is an illustration of the fuel can upended and inserted into the fuel inlet of a vehicle.
Figure 13:
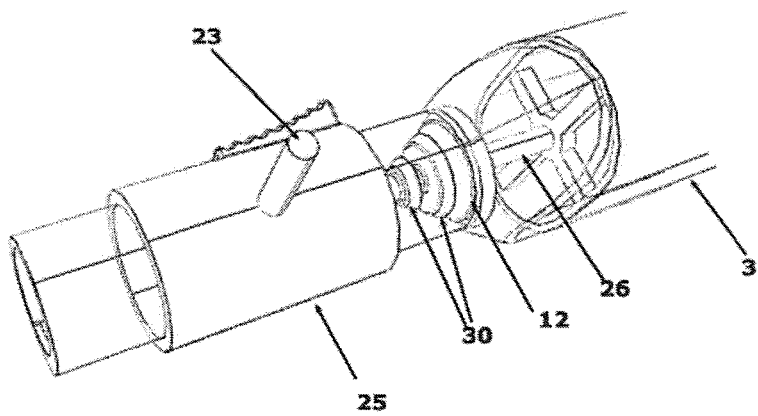
FIG. 13 is an illustration of the spout with some surfaces removed to show the linear valve and related components.

Further details of the connection between the pivot (4) and spout (3) can be seen in FIGS. 10a and 10b. This also shows a filter retainer (22) seated within and below the screw cap (7) for retaining a fuel filter (not shown), which may be provided to prevent solid contaminants such as dust from entering a vehicle's fuel system. Turning now to FIGS. 12a and 13 where a dispensing arrangement and linear valve assembly are shown. The fuel can (1) is completely upended such that the pivot (4) is lowermost so as to dispense fuel as quickly as possible. A linear valve assembly is provided with an actuation linkage including projections (23) extending radially from the spout. In this case two rods extend from either side of a sleeve (25) around the spout (3), and are arranged at a distance from the non-pivot end of the spout such that insertion of the spout into an aperture (24), such as a fuel inlet of a vehicle, brings the projections (23) into abutment with the sides of the aperture. Further insertion of the spout (3) into the aperture (24) causes the sleeve to slide relatively along the spout towards the pivot. An actuating linkage (26), which can be better seen in FIGS. 5 and 6, connects the sleeve to the plug (12) of the linear valve. Movement of the projections (23) and sleeve (25) along the spout (3) also moves the actuating linkage (26), which moves the plug (12) to disengage from a restriction. As an alternative it would be possible to actuate the restriction to disengage from the plug.

Importantly the plug (12) is biased towards the restriction. In this case this is achieved using a helical spring (29) which is visible in FIGS. 5 and 6. To provide for graduated control of fuel flow, throttle elements (30) in the form of one or more disks are provided immediately downstream of the plug (12), and are attached to the actuating rod (26). With this arrangement if the plug is only slightly disengaged the throttle elements remain partially in the way of flow downstream of the plug. However if the plug is disengaged further the throttle elements are increasingly removed from the downstream fuel flow path.

Figure 14A:
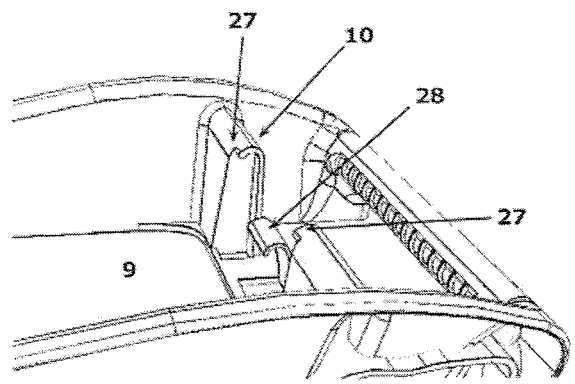
FIG. 14a is an illustration of the upper surface of the fuel can showing connection features for accepting the spout.
Figure 14B:
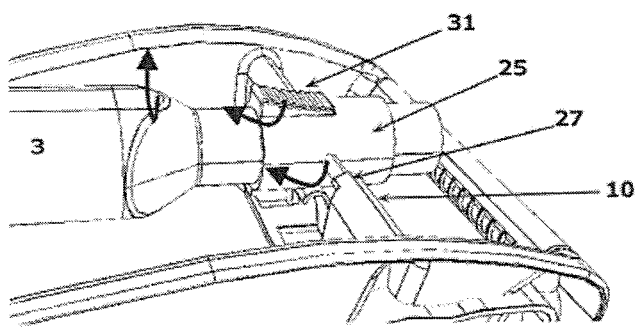
FIG. 14b is an illustration of the same with the spout in place, indicating the mode of release of the spout.
Figure 14C:
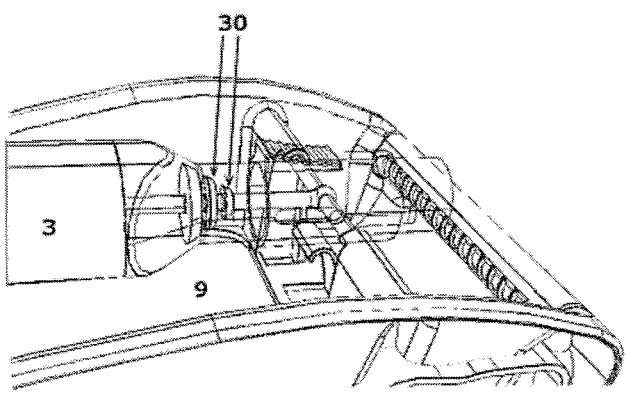
FIG. 14c is an illustration of the same with some spout surfaces removed to reveal the linear valve actuating linkage.

In this embodiment the projections (23) form a bar which passes through two slits (28) either side of the spout (3) (visible in FIGS. 4, 6 and 14c). The midpoint of the bar forms a 'T' with a rod (the actuating linkage) (26) which passes along the middle of the spout to connect with the plug. A sleeve (25) is provided which serves to prevent leakage of fuel from the slits (28) in the spout during dispensing.

For use in particular whilst dispensing fuel from the fuel can, a grip (33) (visible in FIGS. 2, 3, and 4) is provided as a strut across the non-pivot end of the upper surface (9) of the fuel can. The grip also serves to partially protect the end of the spout against being knocked accidentally from its carrying and stowing arrangement.

The spout is advantageously provided with a supporting channel (32) (visible in FIG. 3) to assist its function as a handle. The channel may be provided for ergonomic comfort but preferably is arranged to resist a portion of the force of supporting the fuel can from a user's hand. This reduces the burden on the pivot (4), the connecting rod (13), the projections (23), hooks (28), sleeve (25), and the spout itself. Part of the lifting force is transmitted from a user's hand to the spout by friction with the spout's sides and/or by flexing of the channel upwards.

Referring now to FIGS. 14a, 14b and 14c, a second use for the linear valve is illustrated. The releasable engagement means (10) are provided in the form of projections (23) from the sleeve (25) adapted to engage with retainers (27) in the form of hooks extending from the upper surface (9) of the fuel can body (2). It would also be possible to provide projections from the fuel can body (2) to interface with hooks or indentations in the sleeve (25) of the spout (3), however some form of projection from the sleeve, if only a wide lip, would be desirable for the above described actuation of the linear valve by pressing the spout into a vehicle fuel inlet aperture.

The pivot (4), or in this case a support (28) is adapted to prevent the spout pivoting further toward the fuel can upper surface (9) than needed for engagement of the projections (23) and hooks (28). By depressing the spout towards the fuel can body (2) the sleeve may be permitted to slide such that the projections (23) engage with the hooks (28). The helical spring (29) biases not only the plug, but also the projections, such that the projections are biased into engaging with the hooks. Optionally it is necessary to pull back the sleeve (25) slightly against the spring (29) to move the projections (23) below the hooks (28) and then permit the projections (23) to extend forward under the influence of the spring (29) so as to engage with the hooks (28). Alternatively the outer peripheries of the hooks are provided with ramps such that depression of the spout (3) presses the projections (23) against the ramp, thus causing the sleeve (25) to retract until the projections (23) are able to extend into place under the hooks. Furthermore two projections either side of the sleeve (25) could be replaced by a single projection, for example in the form of a loop between the sleeve and the fuel can body (2).

Once in place under the hooks the support (28) biases the spout upwards preventing accidental release of the projections from the hooks. To release the spout from the fuel can upper body a finger grip (31) is provided for the user to conveniently depress the spout against the resilient support (28) and in essentially one motion to also retract the sleeve and thereby the projections from the hooks. The spout is then free to be pivoted to the dispensing position.

Figure 15A:
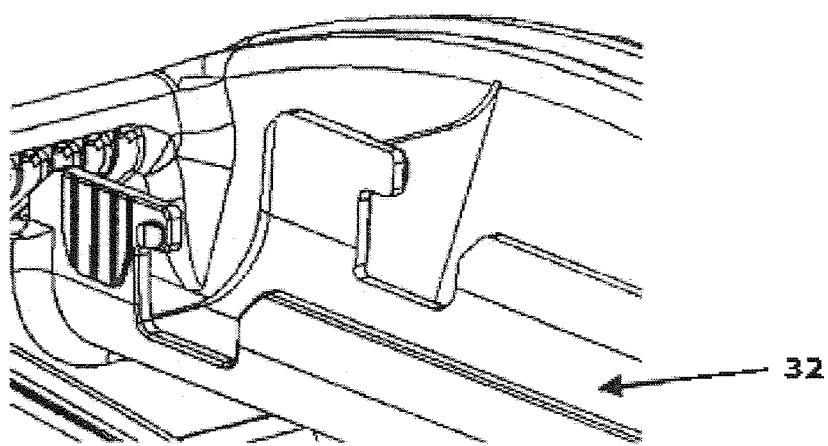
FIG. 15a is an illustration of the upper surface of a fuel can showing alternative spout connection features.
Figure 15B:
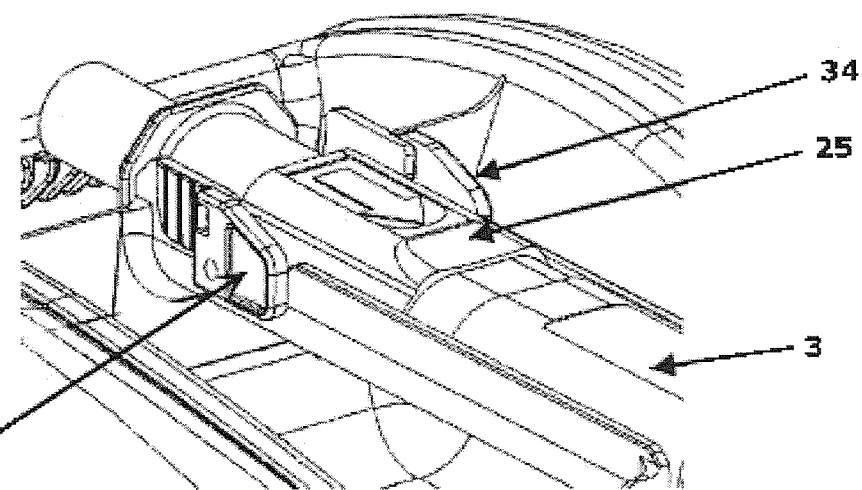
FIG. 15b is an illustration of the same with the spout in place.
Figure 15C:
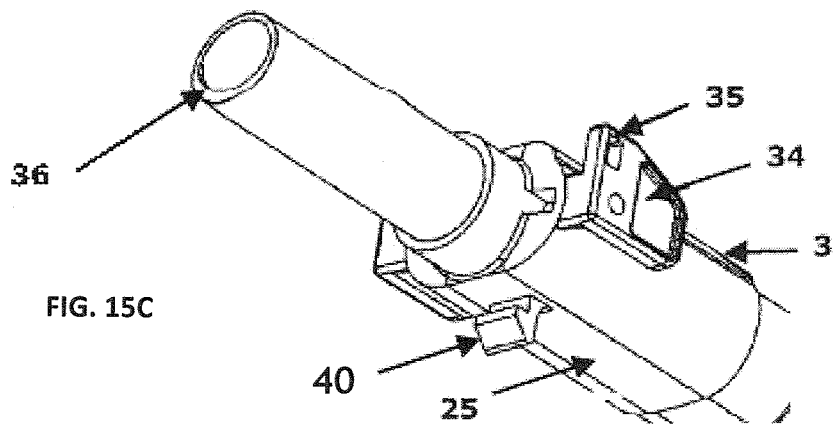
FIG. 15c is a further illustration of the spout shown in FIG. 15b.

An alternative engagement mechanism (10) is shown in FIGS. 15a, 15b and 15c. The sleeve (25) is provided with two projections in the shape of ears, being pivotable about a resiliently flexible root portion thereof. To release the engagement mechanism a user squeezes a main or exposed portion (34) of each of the ears together towards the sleeve (25), thus disengaging a notch from a projection associated with the fuel can upper surface (9). In the arrangement shown in FIG. 15b the action of squeezing the main portion (34) of each of the ears together towards the sleeve causes a minor or otherwise less exposed portion (35) of the ears to move away from the sleeve, and to disengage from small projections which extend horizontally outward from wings (36) extending from the upper surface (9) or in this case in particular from channel (32). The wings (36) are also flexible, and the projections provided with a ramp such that the spout may be engaged therewith by a snap-fit connection.

Figure 7A:
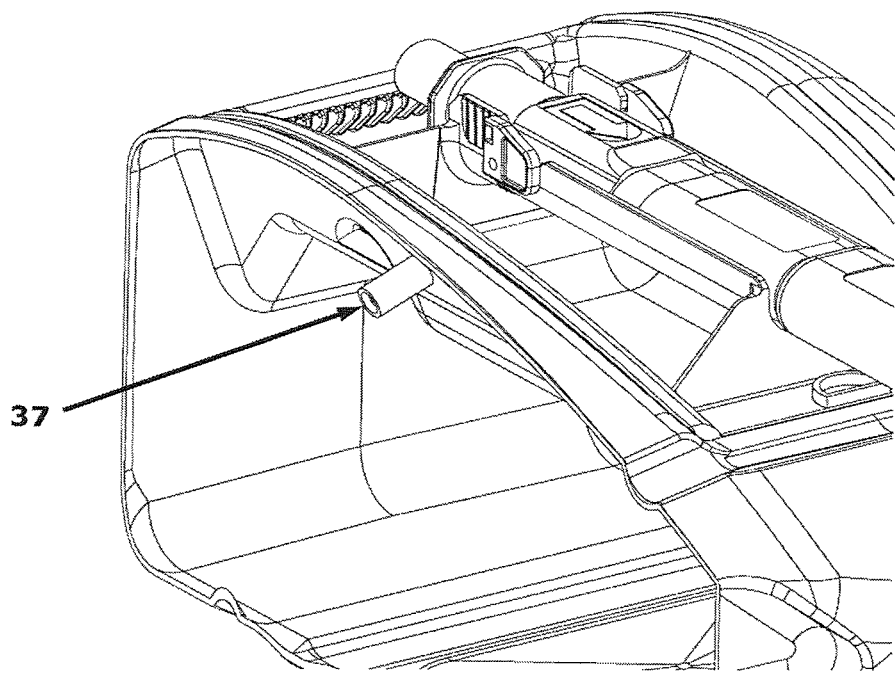
FIG. 7a is an illustration of the air passageway with a one way valve.
Figure 7B:
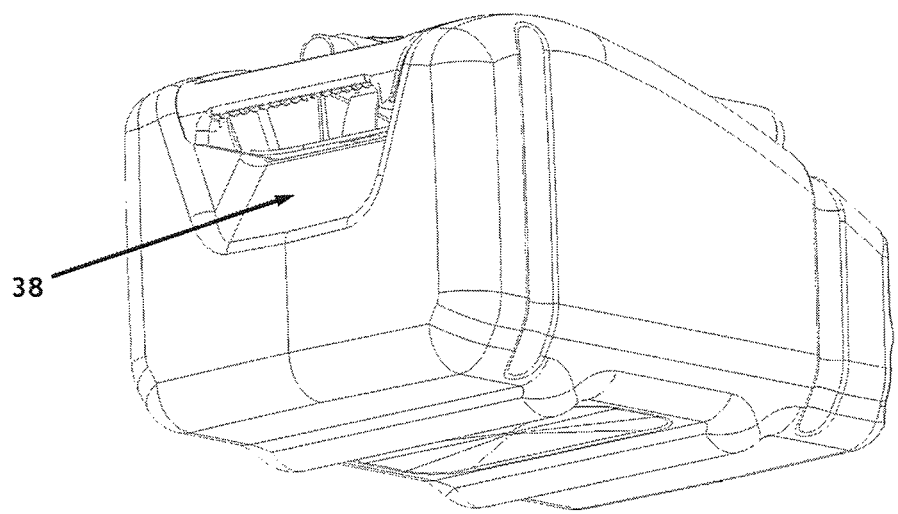
FIG. 7b is an illustration of the location of a manually operated air inlet valve according to an alternative embodiment of the present invention.

Referring to FIG. 7a, an additional air passage is preferably provided to allow air into the container body when liquid in the body is being dispensed. The air passage (37) may be provided at the first valve, and may be a channel parallel to and alongside the spout, preferably within the spout. Optionally however the air passage is an air inlet passing through the container at a position distal to the tip of the spout in the stowed position. The air passage (37) preferably has a valve for permitting air to enter the container during dispensing of liquid through the spout, and for restricting liquid from exiting the container otherwise. Optionally the air passage valve is manually operable by means of a button or lever and is in proximity to dispensing handhold locations. A suitable position for a manually operated valve (38) is centrally mounted on a cut in section of the container directly below the spout as shown in FIG. 7b.

Preferably the air passage valve (not shown) is adapted specifically to permit air to enter during dispensing of a liquid through the spout and for restricting liquid from exiting the container otherwise. Such adaptation may be provided by a one-way valve which may be a reed valve or preferably a float valve. Alternatively the air passage valve may be actuated by positioning spout. This may be achieved by arranging the air passage valve to be biased to an open position where a projection extends towards the spout end's carrying location, such that pivoting the spout to the carrying arrangement causes the spout's end to press upon the projection and close the air passage valve. Alternatively the air passage may be provided along the spout and/or the first valve, and the air passage valve may be integrated into the first or preferably the second valve such that the first or second valve and the air passage valve are jointly opened and closed in use.

Figure 12B:
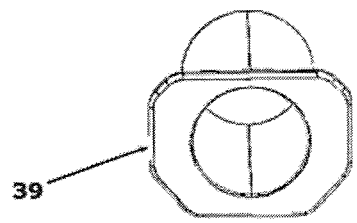
FIG. 12b is an illustration of an extension to the spout to adapt the spout for use with shallow containers.

Preferably the air passage (37) is integrally formed with the side wall of the container, and optionally is a tube extending inwardly from the side wall. Optionally the air passage has a curved section adapted to mitigate ingress of liquid from inside the container up the air passage. This curved section may take the form of a helix which, preferably, makes at least one full turn, ideally at least two. The curved section may be of separate construction from the container wall, and may be an injection moulded part and may be attached by means of a snap-fit connection. Preferably the end of the spout has a raised lower edge forming a lip (36) to retain any residual liquid left in the spout after a pouring operation has been completed. Advantageously the container is provided with a sleeve extension (39) shown in FIG. 12b. In use when it is desired to dispense into a shallow receptacle such as a fuel tank of a lawn mower, the sleeve extension (39) is inserted over the tip of the spout to provide an alternate projection arrangement which may take the form of a radially extending flange, thus reducing the distance that the tip extends into an opening of a shallow receptacle before a projection arrangement engages with the opening and opens the second valve. Preferably the sleeve extension (39) has a snap-fit connection permitting ease of connection to and disconnection from the sleeve.

Preferably a sleeve extension retainer is provided upon the container, which may conveniently be between the spout and container body when the spout is in its stowed position. The sleeve extension retainer is preferably a snap-fit or clip connection feature, which may be substantially circular, being adapted to permit ease of connection or of disconnection with the sleeve extension (39). However, advantageously, the spout in its stowed arrangement prevents the sleeve extension from being accidentally dislodged from the sleeve extension retainer. Preferably there are at least two sleeve extension retainers which, preferably, are both under the spout in its stowed arrangement and may be at either end of a main handle region.

Referring to FIGS. 5 and 6, a rectangular tab (41) protrudes from the spout (3) adjacent to the pivot end (4), thus preventing the threaded cap (7) from opening when the spout is in the carrying and stowing arrangement.

Manufacture of the fuel can body 2) benefits from a two part construction including an injection moulded vessel and an injection moulded upper section with detailed features including the grip (33), hooks (27) (40 in alternative embodiment as shown in FIG. 15c), and support (28). The two parts advantageously snap-fit permanently together.

In more general terms, the fuel can is described as having a dispensing spout which is pivotally operable between a dispensing location extending from the fuel can, and a carrying and stowing arrangement arranged across the top of the fuel can to serve as the main handle, with engagement means to securely retain the dispensing spout safely in the carrying and stowing arrangement when not in use. A valve is arranged to prevent fuel flow in the carrying and stowing arrangement, and to permit fuel flow in the dispensing arrangement. Optionally the spout has an additional valve, actuated by a widened spout portion which engages with the sides of a vehicle's fuel inlet and is caused to open as the spout is pressed into the fuel inlet.

Where the fuel can is described as having an inlet and an outlet, these may be incorporated into a single conduit serving both purposes. Alternatively, it would be possible to provide two separate conduits for the respective purposes.

I claim:

1. A reusable container for storing and dispensing a liquid, comprising a container body provided with an inlet for introducing the liquid into the container body, and an outlet for dispensing the liquid from the container body, there being a closure for the inlet which is removable to permit introduction of the liquid into the container body to refill the container; in which the outlet is provided with an elongate dispensing spout which has a first end adjacent the outlet and a second end from which liquid can be discharged; the spout is mounted for pivotal movement between a first position in which the spout overlies a portion of the container body and a second position in which the spout extends away from the container body; and a valve is provided adjacent the first end of the spout, the valve having a first condition which prevents passage of the liquid from the container body into the spout when the spout is in the first position, and having a second condition which allows the passage of the liquid from the container body into the spout when the spout is in the second position, the valve changing between the first and second conditions automatically in response to pivotal movement of the spout from the first position to the second position; characterised in that the spout is provided with a first locating portion which engages releasably with a second locating portion on the container body so as to retain the spout in the first position, and a second valve is provided adjacent the second end of the spout, the second valve including a resilient element biasing the second valve to a closed state and a control member for changing the second valve to the closed state; wherein the control member is movable axially with respect to the spout to change the second valve to the open state;
the first locating portion is connected to the control member and the arrangement is such that when the first locating portion is engaged with the second locating portion, the second valve is in the closed state;
the first locating portion projects laterally from the control member; and
there are two first locating portions, projecting from opposite sides of the spout and cooperating with respective second locating portions on the container body.

2. A container as claimed in claim 1, characterised in that the resilient element of the second valve serves to bias the first locating portion into engagement with the second locating portion.

3. A container as claimed in claim 1, characterised in that the first locating portion serves as an operating element for the control member of the second valve, when the spout is in the second condition.

4. A container as claimed in claim 1, characterised in that the spout is mounted for pivotal movement in a vertical plane and the first and second locating portions cooperate to restrain upwards pivotal movement of the spout away from the container body, and to restrain axial movement of the control member of the second valve.

5. A container as claimed in claim 4, characterised in that the arrangement is such that disengagement of the first and second locating portions is achieved by urging the second end of the spout downwardly and urging the control member in an axial direction against the bias of the resilient element.

6. A container as claimed in claim 5, characterised in that a second resilient element is provided between the control member and the container body, biasing the second end of the spout upwards.

7. A container as claimed in claim 4 characterised in that the first locating portion is in the form of an elongate member and the second locating portion is in the form of a downwardly facing hook.

8. A container as claimed in claim 4, characterised in that the first locating portion has a part which extends laterally away from the control member and terminates in a resilient hinge with a second part, the second part having a forward portion which is forward of the hinge and a rearward portion which is rearward of the hinge, and one of the forward and rearward portions having means which engages with the second locating portion, the arrangement being such that inwards movement of the other of the forward and rearward portions causes the one of the portions to pivot outwardly so as to be disengaged from the second locating portion.

9. A container as claimed in claim 8, characterised in that means which engages with the second locating portion is an aperture which receives an outwardly projecting lug of the second locating portion.

10. A container as claimed in claim 1, characterised in that when the spout is in the first position and the first and second locating portions are engaged, the spout serves as at least part of a handle for carrying the container.

11. A container as claimed in claim 10, characterised in the container body is provided with a channel member which receives the spout and forms part of the handle.

12. A reusable container for storing and dispensing a liquid, comprising a container body provided with an inlet for introducing the liquid into the container body, and an outlet for dispensing the liquid from the container body, there being a closure for the inlet which is removable to permit introduction of the liquid into the container body to refill the container; in which the outlet is provided with an elongate dispensing spout which has a first end adjacent the outlet and a second end from which liquid can be discharged; the spout is mounted for pivotal movement between a first position in which the spout overlies a portion of the container body and a second position in which the spout extends away from the container body; and a valve is provided adjacent the first end of the spout, the valve having a first condition which prevents passage of the liquid from the container body into the spout when the spout is in the first position, and having a second condition which allows the passage of the liquid from the container body into the spout when the spout is in the second position, the valve changing between the first and second conditions automatically in response to pivotal movement of the spout from the first position to the second position; characterised in that the spout is provided with a first locating portion which engages releasably with a second locating portion on the container body so as to retain the spout in the first position, and a second valve is provided adjacent the second end of the spout, the second valve including a resilient element biasing the second valve to a closed state and a control member for changing the second valve to the closed state, wherein the control member is movable axially with respect to the spout to change the second valve to the open state;

the first locating portion is connected to the control member and the arrangement is such that when the first locating portion is engaged with the second locating portion, the second valve is in the closed state;

the first locating portion projects laterally from the control member;

the spout is mounted for pivotal movement in a vertical plane and the first and second locating portions cooperate to restrain upwards pivotal movement of the spout away from the container body, and to restrain axial movement of the control member of the second valve;

and the arrangement is such that disengagement of the first and second locating portions is achieved by urging the second end of the spout downwardly and urging the control member in an axial direction against the bias of the resilient element.

13. A container as claimed in claim 12, characterised in that the resilient element of the second valve serves to bias the first locating portion into engagement with the second locating portion.

14. A container as claimed in claim 12, characterised in that the first locating portion serves as an operating element for the control member of the second valve, when the spout is in the second condition.

15. A container as claimed in claim 12, characterised in that a second resilient element is provided between the control member and the container body, biasing the second end of the spout upwards.

16. A container as claimed in claim 12 characterised in that the first locating portion is in the form of an elongate member and the second locating portion is in the form of a downwardly facing hook.

17. A container as claimed in claim 12, characterised in that the first locating portion has a part which extends laterally away from the control member and terminates in a resilient hinge with a second part, the second part having a forward portion which is forward of the hinge and a rearward portion which is rearward of the hinge, and one of the forward and rearward portions having a means which engages with the second locating portion, the arrangement being such that inwards movement of the other of the forward and rearward portions causes the one of the portions to pivot outwardly so as to be disengaged from the second locating portion.

18. A container as claimed in claim 17, characterised in that means which engages with the second locating portion is an aperture which receives an outwardly projecting lug of the second locating portion.

19. A container as claimed in claim 12, characterised in that there are two first locating portions, projecting from opposite sides of the spout and cooperating with respective second locating portions on the container body.

20. A container as claimed in claim 12, characterised in that when the spout is in the first position and the first and second locating portions are engaged, the spout serves as at least part of a handle for carrying the container.

21. A container as claimed in claim 20, characterised in the container body is provided with a channel member which receives the spout and forms part of the handle.

\* \* \* \* \*